United States Patent
Rozario et al.

(10) Patent No.: US 9,233,718 B2
(45) Date of Patent: Jan. 12, 2016

(54) STRIKER STIFFENER REINFORCEMENT

(75) Inventors: Savio Rozario, Columbus, OH (US); Warren A. Day, Cambridge, MA (US); Aron K. Madsen, Marysville, OH (US); Brian Timothy O'Hara, Columbus, OH (US); Adam Rompage, Dublin, OH (US); Brandon Koester, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 440 days.

(21) Appl. No.: 13/106,501

(22) Filed: May 12, 2011

(65) Prior Publication Data

US 2012/0286526 A1  Nov. 15, 2012

(51) Int. Cl.
- *E05B 15/02* (2006.01)
- *B62D 25/04* (2006.01)
- *E05B 85/04* (2014.01)

(52) U.S. Cl.
CPC .............. *B62D 25/04* (2013.01); *E05B 85/045* (2013.01); *Y10T 292/696* (2015.04)

(58) Field of Classification Search
USPC .......... 292/341.15, 340, 341, 341.12, 341.13, 292/341.14
See application file for complete search history.

(56) References Cited

U.S. PATENT DOCUMENTS

| | | | |
|---|---|---|---|
| 4,615,558 A | | 10/1986 | Nakamura et al. |
| 5,833,024 A * | | 11/1998 | Kaneko ........................ 180/69.2 |
| 6,059,352 A | | 5/2000 | Heldt et al. |
| 6,179,364 B1 * | | 1/2001 | Takahashi ...................... 296/76 |
| 6,692,057 B2 | | 2/2004 | Igarashi et al. |
| 7,147,257 B2 * | | 12/2006 | Johansen et al. ......... 292/341.15 |
| 7,275,774 B2 * | | 10/2007 | Oberheide ............... 292/341.16 |
| 8,226,157 B2 * | | 7/2012 | Mackenzie et al. ...... 296/193.06 |
| 8,469,413 B2 * | | 6/2013 | Novajovsky et al. .... 292/341.19 |
| 2006/0208537 A1 | | 9/2006 | Dingman et al. |
| 2009/0289476 A1 | | 11/2009 | Bufe et al. |
| 2010/0032981 A1 | | 2/2010 | Chen et al. |

FOREIGN PATENT DOCUMENTS

| | | |
|---|---|---|
| DE | 24 21 189 | 11/1975 |
| EP | 2 096 238 | 9/2009 |
| JP | 63-114775 | 7/1988 |
| JP | 7-329827 | 12/1995 |
| JP | 2007-112355 | 5/2007 |
| JP | 2008-239128 | 10/2008 |

OTHER PUBLICATIONS

PCT/US2012/036484 Search Report.

* cited by examiner

*Primary Examiner* — Mark Williams
(74) *Attorney, Agent, or Firm* — Kenealy Vaidya LLP

(57) ABSTRACT

A striker reinforcement plate for support of a striker member on an automotive vehicle body. The plate has a first substantially planar face, including at least two holes for receiving mating bolts or screws. A flange extends from multiple edges of the face substantially perpendicular to the face. The flange includes mounting tabs extending outwardly and substantially perpendicular to the flange. The mounting tabs are provided for mating with an automotive vehicle pillar. The face of the striker reinforcement plate mates with a rear surface of a striker stiffener.

10 Claims, 4 Drawing Sheets

STRIKER STIFFENER REINFORCEMENT

BACKGROUND

The present disclosure relates generally to vehicles and, more specifically, to reinforcement of vehicle doors. In particular, it relates to reinforcement of the striker element which is a component of the door locking mechanism.

It is known to provide a vehicle with a body having a door opening. It is also known to provide a door pivotally or slidably connected to the body to open and close the door opening. A door can be pivotally mounted on hinges or slidably mounted on tracks. In either embodiment, the door is equipped with a latch mechanism that mates with a striker element mounted to a pillar on the vehicle body.

It is further known that vehicles may have imposition of external side loads during operation. A striker element is one of the main items keeping a door mated to the automotive frame. The pillar carries the striker, which engages the latch mechanism carried by the door to secure the door in a closed orientation with respect to the automotive frame. The latch and striker are designed to work together to secure the door against the pillar, and prevent the door from inadvertently opening in the event of a crash. Since the striker is set and adjusted from the door opening, attaching the striker to the door opening panel or to the body side panel may not provide sufficient strength to manage the loads required during the side impact or pull-out tests. Reinforcement may be required to allow the striker and the striker reinforcement to distribute the load over a greater area. A typical striker reinforcement is a plate attached to the side of the pillar.

To reduce the likelihood of ejection through door openings by keeping vehicle doors closed in crashes, it is desirable that the vehicle's side door, while in the fully latched position, shall not separate from the vehicle when a total force of 18,000 N is applied along the vehicles transverse axis. The striker stiffener reinforcement plate of the present disclosure advantageously helps achieve these standards.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, a striker reinforcement plate for support of a striker member on an automotive vehicle pillar is disclosed. The reinforcement plate has a first substantially planar face. Flanges extend from the sides of the face in a direction substantially perpendicular to the face. Mounting tabs extend outwardly from the flanges and are substantially normal thereto.

According to a second embodiment, a door assembly for closing an opening in an automotive vehicle is disclosed. The assembly includes a striker member mounted to a stiffener body and a stiffener reinforcement plate. The striker member engages a first side of the stiffener body and the stiffener reinforcement plate engages a second side of the stiffener body. The stiffener reinforcement plate further includes projecting tabs adapted for securement to a pillar of the automotive vehicle.

According to a further embodiment, a striker assembly is disclosed. The assembly comprises a striker stiffener, a striker mounted to a front side of the striker stiffener and a striker stiffener reinforcement. The reinforcement is mounted to a opposed side of the striker stiffener substantially opposite the striker. The striker stiffener reinforcement includes a means for attachment to a vehicle quarter pillar.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
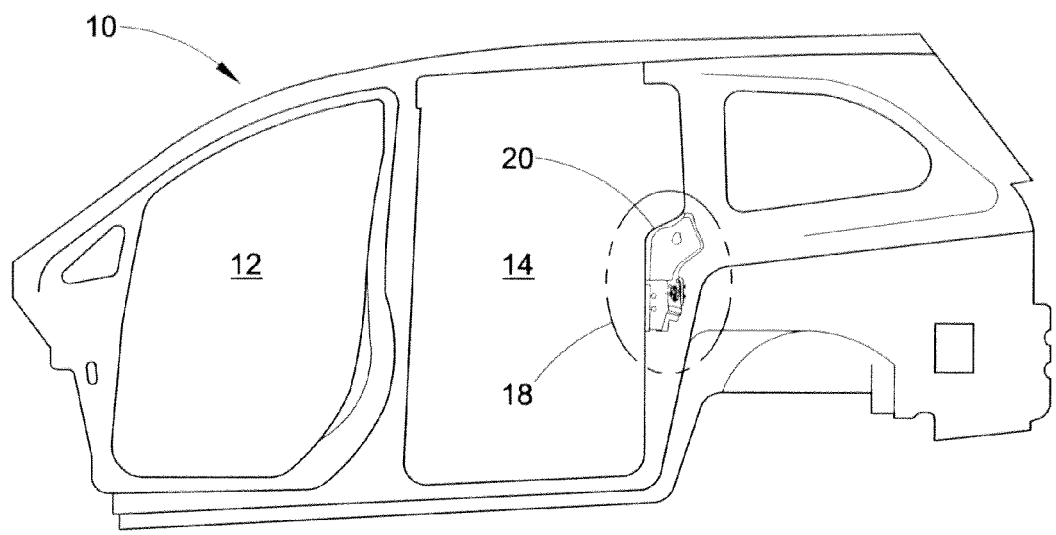
FIG. 1 is a partial perspective view of an automotive body structure which depicts front and rear door body openings and the placement of a rear door striker assembly.

Referring now to FIG. 1, a vehicle side body structure 10 is depicted. Body structure 10 is typical of a minivan type vehicle, including a forward door passage 12 and a rear door passage 14. It is envisioned that the present striker assembly is suitable for either hinged doors or rear sliding doors. However, the following description focuses on the sliding rear door embodiment.

Rear quarter pillar 16 defines the rear side of rear door opening 14. Area of detail 18 includes a striker assembly 20 secured to the rear quarter pillar 16 to facilitate engagement of a door latch (not shown), when the door is in a closed condition. Area of detail 18 is the focus of FIGS. 2 and 3.

Figure 2:
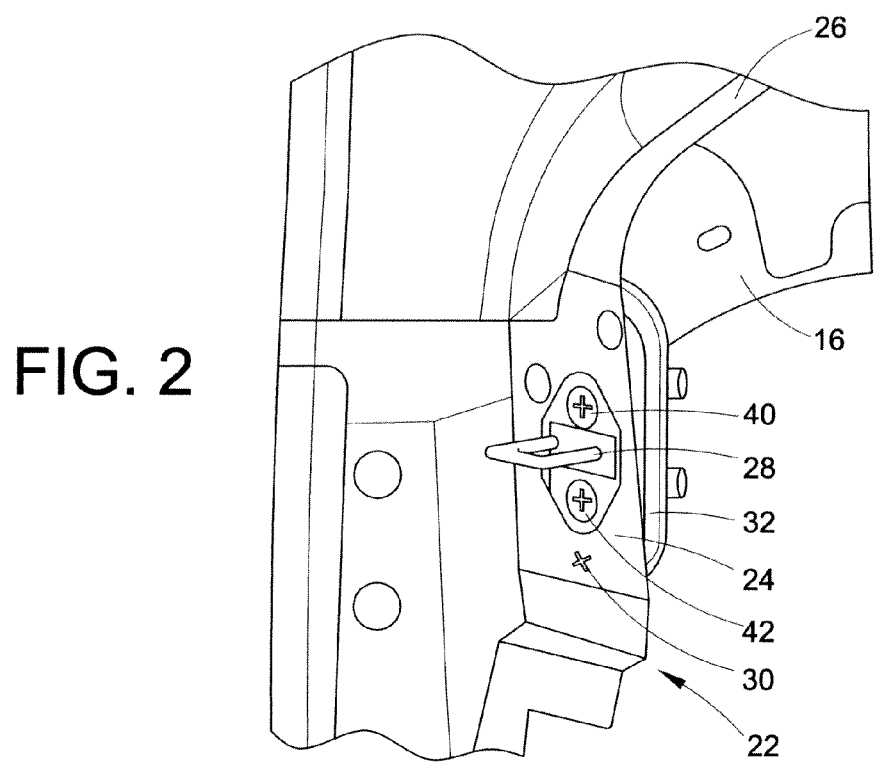
FIG. 2 is a front side perspective view of the striker assembly of FIG. 1.
Figure 3:
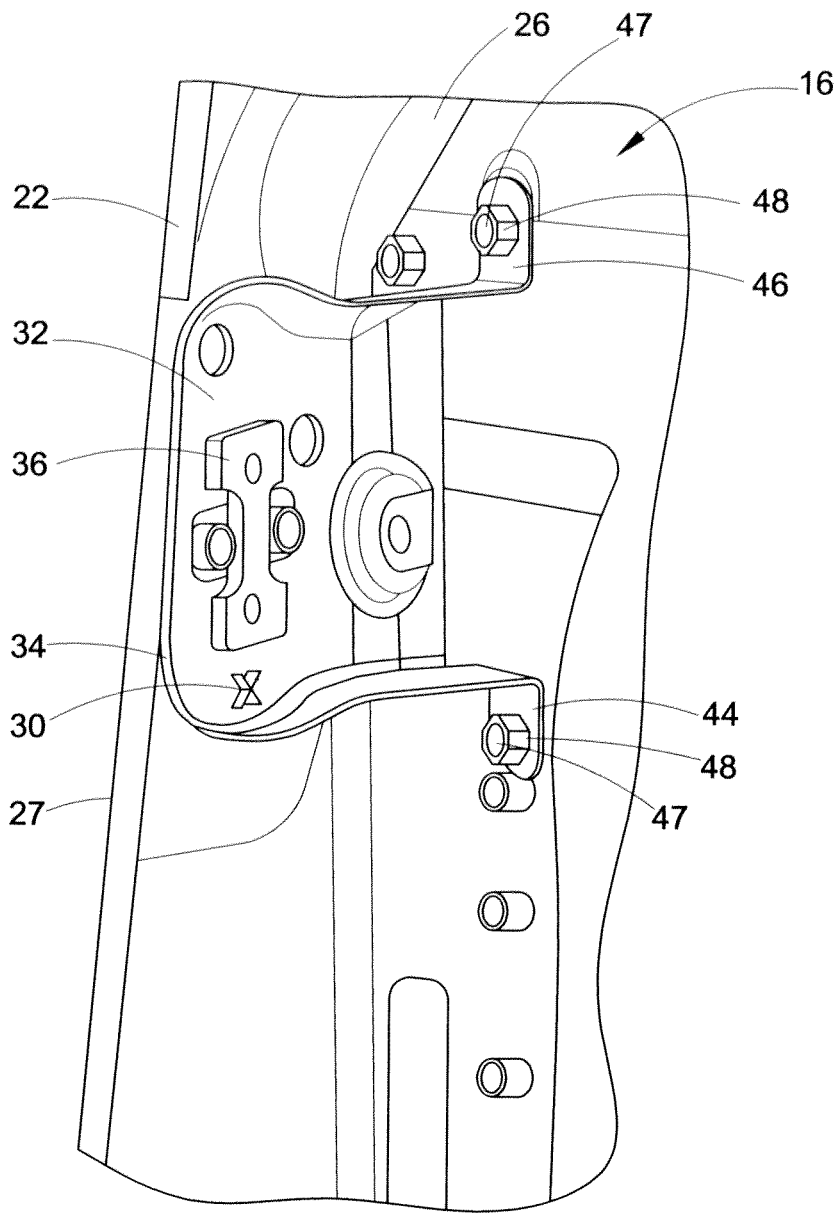
FIG. 3 is a rear side perspective view of the striker assembly of FIG. 1.
Figure 4:
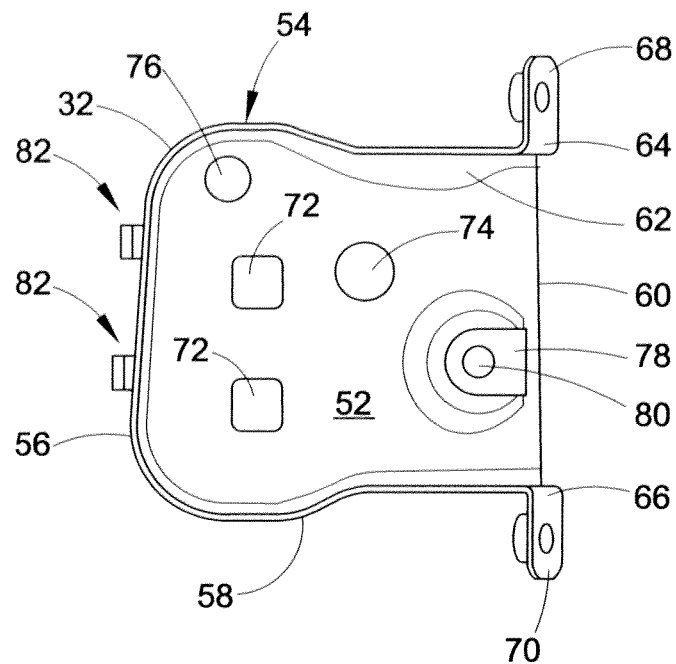
FIG. 4 is a rear side elevation view of the striker stiffener reinforcement.
Figure 5:
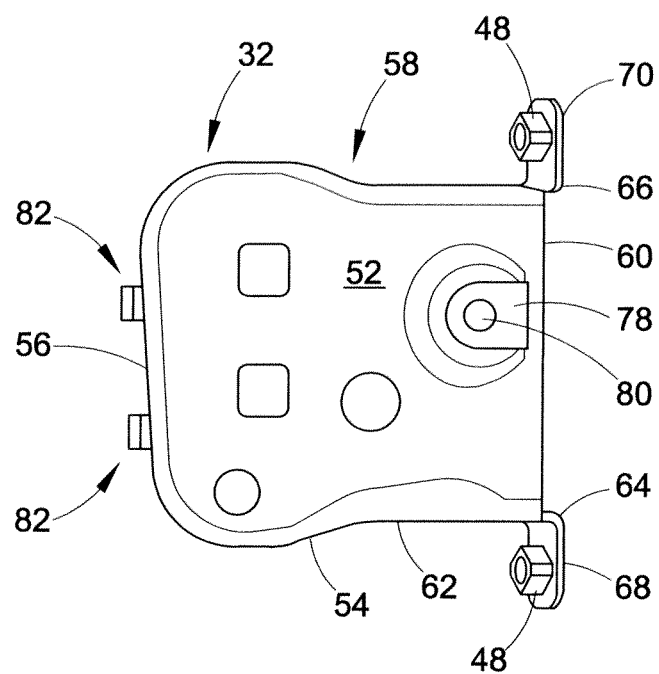
FIG. 5 is a front side elevation view of the striker stiffener reinforcement.
Figure 6:
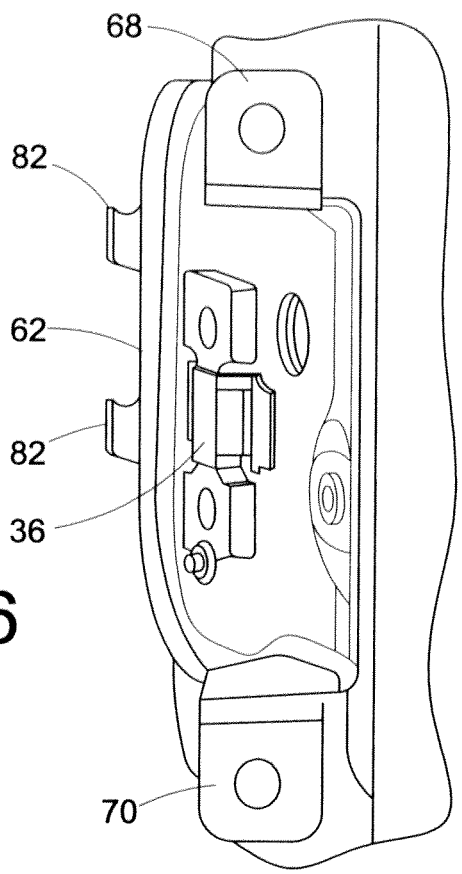
FIG. 6 is an end view of the striker stiffener reinforcement.
Figure 7:
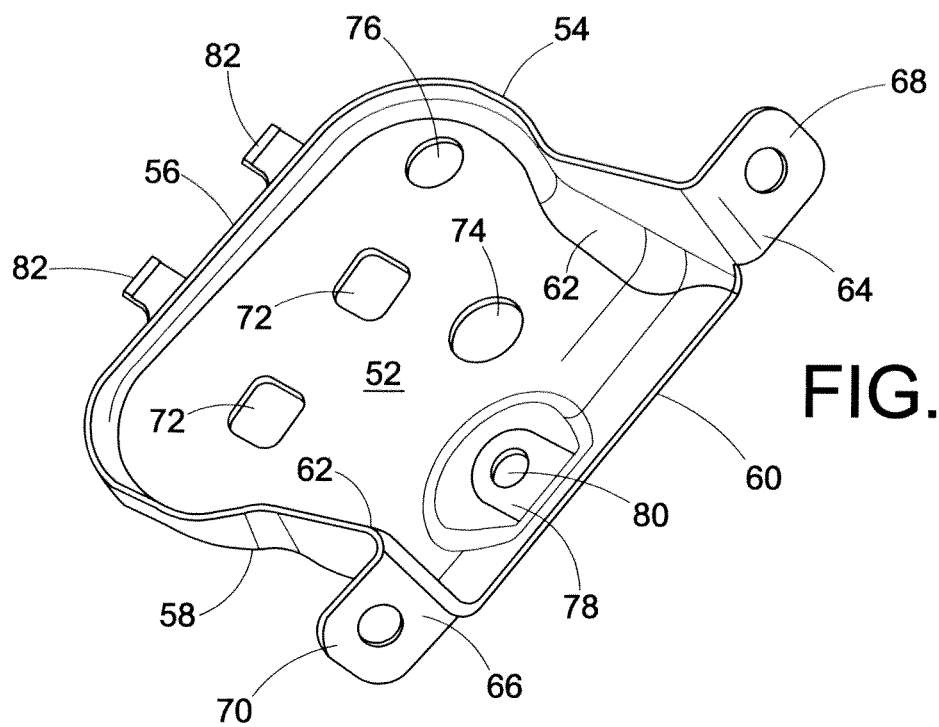
FIG. 7 is a perspective view of the striker stiffener reinforcement.

With reference to FIGS. 2 and 3, a striker stiffener 22 is mounted to rear quarter pillar 16. Striker stiffener 22 includes a main body region 26 overlapping and mated to rear quarter pillar 16. This mating can be achieved via weld, braze, rivet, bolt, screw or any other means known in the art, or any combination thereof. Front surface 24 of striker stiffener 22 receives striker 28 and secures striker 28 to the striker stiffener on front side 24. Striker stiffener reinforcement 32 engages a rear side 34 of striker stiffener 22. The rigid connection between these two parts is enhanced because the door striker stiffener reinforcement can be welded in four spots to the striker stiffener.

A spot weld 30 may be provided.

Striker back plate 36 receives striker screws 40 and 42 to secure striker 28 to striker stiffener 22 and in turn to striker stiffener reinforcement 32. In order to equally distribute the load from the striker 28 to the striker stiffener reinforcement 32, the screws 40, 42 are received generally centrally on the body of the striker/stiffener reinforcement 32. Since the same hole size can be used on the striker 28 and striker stiffener reinforcement 32 the screws or alternatively bolts can be shot through both parts to provide more rigidity. Striker stiffener reinforcement 32 is further secured to the rear quarter pillar 16 via mounting tabs 44 and 46 and receive bolts 47 which mate with mounting nuts 48.

Turning to FIGS. 4-7, striker stiffener reinforcement 32 includes a generally planar main body 52 having edges 54, 56, 58 and 60. A flange 62 extends generally perpendicular from the surface of the main body 52 and includes regions 54, 56 and 58. Flange 62 extends relatively farther from main body 52 in regions 54 and 58 (see FIG. 7) adjacent edge 60 providing a suitable transition into corners 64, 66 and subsequently tabs 68, 70. These extended flange regions 54 and 58 provide improved load transfer to tabs 68 and 70. Moreover, by providing flange regions 54 and 58 with a width at least substantially equal to a width of the tabs 68, 70, structural integrity is improved. Flange 62 provides strength and rigidity to the striker stiffener reinforcement 32. The striker stiffener reinforcement 32 can be made out of sheet steel as is common in the art. It is envisioned that a sheet steel between about 1.0 and 2.0 mm in thickness is appropriate.

Flange 62 extends from main body 52 and is bent outwardly at a substantial 90° angle at corners 64 and 66. In this manner, mounting tabs 68 and 70 are integrally formed in a planar relationship relative to each other and, substantially parallel to edge 60, which facilitates mounting of the striker stiffener reinforcement 32 to the quarter pillar 16 as best seen in FIG. 3.

The nuts 48 can be welded to the two mounting tabs on the striker stiffener reinforcement 32 to allow bolts 47 to be shot through the rear quarter pillar 16 and the striker stiffener reinforcement 32. Clearance holes 72 are provided in main body 52 to receive the screws 40 and 42 for joining striker 28 and striker back plate 36. Holes 74 and 76, and 80 in emboss 78, are provided to facilitate part stamping and for alignment to mating parts for welding procedures. Furthermore, registration projections 82 extend from edge 56 are provided as a handling aid during the stamping process.

The door striker assembly 20 helps prevent translation and rotation due to an applied load by creating a rigid connection between the striker 28, striker stiffener 22, striker stiffener reinforcement 32, and the quarter pillar 16. This rigid connection applies a counter moment to the door striker when force is applied in the lateral direction simulating the event of the slide door being pushed from inside or outside the car.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A striker reinforcement plate for support of a striker member of an automotive vehicle frame member, said striker reinforcement plate comprising a first generally planar face, said face defined by four edges including a first edge, the first edge and the third edge being disposed on opposed sides of the face and are at least generally parallel, the second edge extending between the first edge and the third edge, the fourth edge extending between the third edge and the first edge, a flange extending from the first edge, the second edge, and the third edge, said flange being at least substantially perpendicular to the face, the flange being at least substantially perpendicular to the face, the flange including a first mounting tab extending from a corner formed by an intersection of the first edge and the fourth edge and a second mounting tab extending from a corner formed by an intersection of the third edge and the fourth edge, said first mounting tab being at least substantially perpendicular to the flange extending from the first edge and said second mounting tab being at least substantially perpendicular to the flange extending from the third edge.

2. The striker reinforcement plate of claim 1 wherein said flange has a width dimension extending away from said face and wherein said width varies along a length of said flange.

3. The striker reinforcement plate of claim 2, wherein said flange includes a greatest width adjacent said mounting tabs.

4. The striker reinforcement plate of claim 1, wherein the fourth edge is flange free.

5. The striker reinforcement plate of claim 4, where said fourth edge, resides in a plane substantially parallel to a planar surface of said first and second mounting tabs, said mounting tabs being configured for engaging said automotive vehicle frame.

6. The striker reinforcement plate of claim 4 wherein said face includes at least two holes adapted to receive bolts and screws.

7. The striker reinforcement plate of claim 3 wherein the flange width is substantially equal to a width of the mounting tabs adjacent thereto.

8. The striker reinforcement plate of claim 1 wherein said mounting tabs are at least substantially perpendicular to the face.

9. The striker reinforcement plate of claim 1 wherein said mounting tabs include attached nuts, said nuts being arranged concentric to a passage in said mounting tabs.

10. The striker reinforcement plate of claim 1 wherein second and fourth edges are disposed on opposed sides of the face and are at least generally parallel.

* * * * *